Sept. 21, 1954      W. H. TAIT      2,689,380
METHOD OF MAKING BEARINGS
Filed Jan. 29, 1951
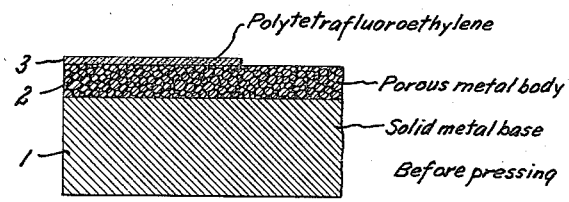
Fig. 1.
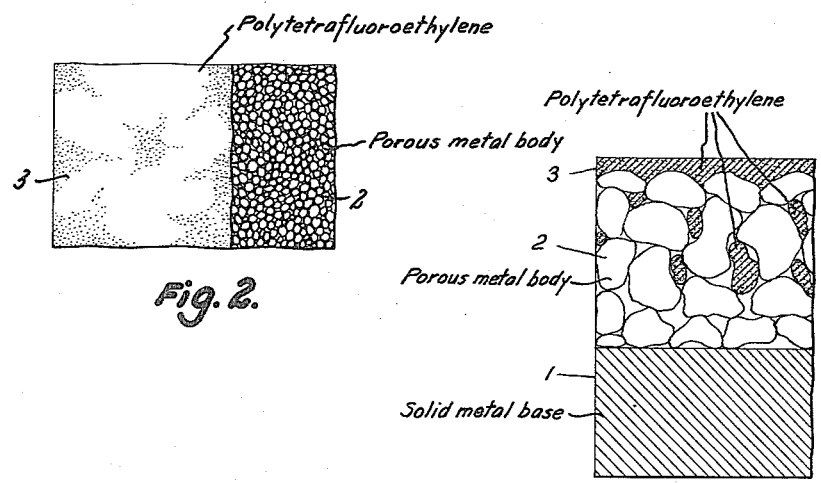
Fig. 2.
Fig. 4.
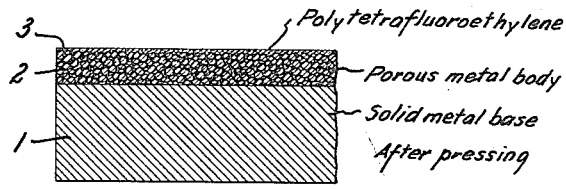
Fig. 3.
INVENTOR
William Henry Tait
BY Pierce, Scheffler & Parker
ATTORNEYS

UNITED STATES PATENT OFFICE 2,689,380

METHOD OF MAKING BEARINGS

William Henry Tait, Alperton, Wembley, England, assignor, by mesne assignments, to The Glacier Metal Company, Limited, Alperton, Wembley, England Application January 29, 1951, Serial No. 208,439

5 Claims. (Cl. 18—59)

This invention relates to plain bearings or the like, the term "plain bearings" including journal bearings or bearing liners, thrust washers and flat anti-friction elements for sliding contact.

The invention has for its object to provide a method for the production of an improved bearing material, structure or liner adapted for effective operation without the use, or in the temporary absence, of an intermediate separating film of oil or other lubricant.

It is known that polytetrafluoroethylene possesses good anti-friction properties for use with steel or other usual journal materials and that it retains these properties in the absence of an intermediate separating film of oil or other lubricant and at temperatures up to about 280° C.

However, polytetrafluoroethylene has three disadvantages. In the first place, it possesses a high coefficient of thermal expansion which, on any substantial variation in temperature, will change the clearance between the bearing and journal or thrust face to cause excessive looseness when cooled again to atmospheric temperature. In the second place, it possesses low heat conductivity with the result that the surface layers of a bearing are liable to overheat above the transition temperature (327° C.). In the third place it possesses poor mechanical strength.

These disadvantages render polytetrafluoroethylene in itself unsuitable for successful application to many practical bearing problems, particularly when severe load conditions are likely to be encountered.

More specifically, the present invention has for its object to utilise the good anti-friction properties of the polytetrafluoroethylene while avoiding the disadvantages referred to above.

Bimetallic porous surfaced strip material from which bushes, bearings, bearing liners, thrust washers or the like can be produced is usually prepared by first spreading on to a backing strip of steel or relatively strong non-ferrous metal or alloy, a layer of suitable metallic powder or powders and then sintering the said layer to form the porous metallic structure and to bond it to the backing. By suitable control of the temperature, the powder grain size and shape, and the time of sintering, a porous structure with predetermined pore size and volume can be obtained utilising powders of any one or more of several metals and alloys, such as copper, tin-bronze, lead-bronze, lead-tin-bronze, silver, iron or cupro-nickel.

Furthermore, by usual conventional methods, the porous metallic structure can be strongly bonded to the non-porous relatively strong backing material such as steel, or a non-ferrous alloy such as a copper alloy.

According to one embodiment of the present invention, a method of producing plain bearings as hereinbefore described comprises applying a layer of poly-tetra-fluoro-ethylene on to the surface of a porous metallic structure produced by sintering metallic powder and forcing the poly-tetra-fluoro-ethylene into at least the surface pores of the metallic structure by the application of pressure. Preferably the pressing operation is carried out while heating to a temperature of 250° to 300° C. in order to soften the polytetrafluoroethylene and facilitate its flow for filling the pores. The poly-tetra-fluoro-ethylene may be applied in the form of powder or in the form of sheet.

A duplex structure in which the metallic and non-metallic elements appear as interlaced sponges of fine texture may be produced by sintering together a suitable mixture of powders of the polytetrafluoroethylene and of a suitable metal, a metal alloy or mixture capable of being sintered at temperatures below the disassociating temperature of the polytetrafluoroethylene, e. g., below 400° C. Silver is one such metal.

The incorporation of the polytetrafluoroethylene in the porous or open metallic structure serves to compensate for the low heat conductivity of the compound and also serves to limit the effect of thermal expansion of the polytetrafluoroethylene. Moreover, the metal structure provides the necessary strength which is lacking in polytetrafluoroethylene by itself.

In carrying the invention into effect according to one embodiment, a porous metallic structure or a bimetal material having a porous bearing surface structure is produced by sintering a metallic powder on to a backing strip. For example, a layer of metallic powder or mixture of powders of suitable composition to produce, on sintering, a copper-tin-lead, e. g., of 80:10:10 composition, is applied on to a copper-plated steel strip, the powder grain size and shape and the period and temperature of the sintering operation being such that the sintered structure is of a porous spongy nature, the total voids being, for instance, 20% of the total volume.

On the porous sur face of the bimetallic strip, poly-tetra-fluoro-ethylene is applied as by spreading thereon in powder form or by laying on in the form of a sheet and, while heating to 250° to 300° C., a suitable pressure, for example about one ton per square inch, is exerted until the softened polytetrafluoroethylene fills the pores in the porous metallic structure. Pressure preferably is exerted by means of a closed die adapted to prevent the polytetrafluoroethylene from flowing over the edges so that it is thereby constrained to enter the pores, but this is not essential. Although the porous structure preferably should be completely filled with the polytetrafluoroethylene, it is sufficient if the penetration of the poly-tetra-fluoro-ethylene into the pores extends to a depth of 0.030 to 0.040 inch from the bearing surface. The composition and character of the porous metallic structure may vary widely as is well known in the art, and the degree of pressure exerted, temperature at which the operation is carried out, and the period thereof, may be varied as required according to the character of the porous metallic structure and the form in which the polytetrafluoroethylene is applied. Inasmuch as sintering of the metallic structure is effected before the application of the polytetrafluoroethylene and is thus not restricted to temperatures below the disassociating temperature of the polytetrafluoroethylene, wide latitude is available in the selection of the metallic powder employed and the conditions of sintering to secure the most satisfactory porous structure and the most effective bonding to the backing when such backing is provided.

In a modification of the invention, poly-tetrafluoro-ethylene in powder form and metallic powder of a suitable metal, alloy or mixture of metals capable of being sintered below the disassociating temperature of the polytetrafluoroethylene, are mixed in the ratio of five parts by volume of metallic powder to one part by volume of the powdered polytetrafluoroethylene, both powders being sufficiently fine to pass through a 100 mesh screen. The mixed powder is then cold-pressed in a suitable die, the pressure being sufficient to compact the mixed powders into a moulded but "uncured" form sufficiently coherent for handling. This moulded form is then sintered in an atmosphere of cracked ammonia, i. e., a mixture of nitrogen and hydrogen produced by the disassociation of ammonia, at a temperature of about 360° C. for about one hour. While still hot the sintered body is pressed in a mould to the exact final shape desired, thereby producing a bush having a duplex structure consisting of metal and poly-tetra-fluoro-ethylene in the form of interlaced sponges of fine texture, which bush may be of any desired size or shape and may be utilised in place of any self-lubricating porous bush of the usual type.

In a further embodiment, and in the application of the invention to the production of a composite thin-walled bearing having a steel, bronze or other suitable backing, a plain blank, for example of steel of suitable dimensions for subsequent forming to cylindrical or semicylindrical form, is electroplated with a layer of copper about 0.0005 inch thick, and thereafter with a layer of silver 0.0003 inch on its surface. On this electroplated blank a layer of mixed metallic and non-metallic powders as hereinbefore specified is spread, this layer being of suitable thickness and being cold-pressed with a sufficiently high pressure to ensure that it will remain on the blank as an adherent coating capable of being handled. The composite blank is then sintered in an atmosphere of cracked ammonia at a temperature of 360° C. for about one hour and is then pressed flat while still hot to consolidate the composite structure produced. The blank is then worked into the form of a bush or half-bush by any conventional or suitable method. Where the structure is formed by sintering a mixture of metallic powders and powdered polytetrafluoroethylene, the metallic constituent, e. g., silver, must be capable of sintering in a controlled atmosphere at temperatures below 400° C.

The metallic structure may be of any suitable metal, metal alloy or metallic mixture.

Fig. 1 is an enlarged fragmentary diagrammatic sectional view of a solid metal base or backing having a layer of porous or sponge metal attached thereto and a layer of polytetrafluoroethylene in finely divided or sheet form superposed thereon, Fig. 2 is a top plan view of the structure shown in Fig. 1, and Fig. 3 is a view similar to Fig. 1 after the layer of polytetrafluoroethylene has been pressed into the porous layer, and Fig. 4 is an enlarged sectional view showing the pores in the layer of sponge metal and the polytetrafluoroethylene extending from the surface into these pores.

Referring to the drawings 1 is the metal base or support, 2 is the porous metal layer and 3 is the polytetrafluoroethylene.

It will be understood that the invention is not limited to the particular embodments hereinbefore described, and that a duplex structure consisting of a porous or openwork metallic support with polytetrafluoroethylene interspersed therein may be produced in any other suitable manner.

I claim:

1. A method of producing a bearing material which comprises applying a layer of polytetrafluoroethylene to a surface of a continuous metal body having closely spaced cavities in at least said surface, said cavities being interconnected below said surface and subjecting the body with said layer to heat and pressure to force the polytetrafluoroethylene into said cavities including the interconnecting portions thereof.

2. A method as defined in claim 1 in which at least some of said cavities are interconnected on the surface.

3. A method as defined in claim 1 in which the layer of polytetrafluoroethylene is in the form of a sheet.

4. A method as defined in claim 1 in which the layer of polytetrafluoroethylene is in the form of a powder.

5. A method as defined in claim 1 in which the metal body is porous throughout.

References Cited in the file of this patent

UNITED STATES PATENTS

| Number | Name | Date |
|---|---|---|
| 2,246,092 | Gilman | June 17, 1941 |
| 2,456,262 | Fields | Dec. 14, 1948 |
| 2,456,621 | Cheney | Dec. 21, 1948 |
| 2,459,598 | Stott | Jan. 18, 1949 |
| 2,488,446 | Swiss | Nov. 15, 1949 |